United States Patent Office 3,409,604
Patented Nov. 5, 1968

3,409,604
POLYMERIZATION OF BUTADIENE
Raymond A. Stewart, Jules Darcy, and Lloyd A. McLeod, Sarnia, Ontario, Canada, assignors to Polymer Corporation Limited, Sarnia, Ontario, Canada, a body corporate and politic
No Drawing. Continuation-in-part of application Ser. No. 214,527, Aug. 3, 1962, which is a continuation-in-part of application Ser. No. 36,120, June 15, 1960. This application is also a continuation-in-part of application Ser. No. 114,631, June 5, 1961. This application Dec. 27, 1966, Ser. No. 604,610
Claims priority, application Great Britain, June 19, 1959, 21,148/59, Patent 917,401; Canada, June 28, 1960, 802,056, Patent 664,393
18 Claims. (Cl. 260—94.3)

ABSTRACT OF THE DISCLOSURE

A process of polymerizing butadiene to a stereoregular polymer of at least 75% cis-1,4 content in the presence of a catalyst consisting of two components. The first component is represented by the formula $TiCl_n(OR)_{4-n}$ where R is a hydrocarbon radical having 1–12 carbon atoms and $n$ is 0–3. The second component is aluminum hydrocarbyl mono- or diiodide represented by the formula $AlR'_mI_{3-m}$ or a mixture of $AlR'_3$ and an iodine compound XI where X is H, Cl, Br or I, $m$ is 1–2, and R' is hydrogen or R.

---

This application is a continuation-in-part of our copending application Ser. 214,527, filed Aug. 3, 1962, entitled, "Polymerization of Butadiene," now abandoned, which is a continuation-in-part of application Ser. No. 36,120, filed June 15, 1960, entitled, "Polymerization of Butadiene," now abandoned, and claims a Convention priority in Great Britain of June 19, 1959. This application is also a continuation-in-part of our copending application, Ser. No. 114,631, filed June 5, 1961, entitled, "Polymerization of Butadiene," now abandoned and claiming a Convention priority in Canada of June 28, 1960.

This invention relates generally to the polymerization of conjugated diolefins. It is particularly concerned with the polymerization of butadiene using a novel catalyst combination which produces a polymer that is predominantly in the cis-1,4 configuration.

When butadiene is polymerized, the monomer units may enter the polymer molecule in a head-to-tail fashion in what is called a 1,4 configuration. Alternatively, the units may enter the molecule in such a way that only two of the carbon atoms become part of the backbone of the polymer molecule, in which case the product is said to be in the 1,2 configuration. The 1,4 configuration may be either cis-1,4 or trans-1,4 depending on the configuration about the residual double bond. It has long been recognized that the molecular structure of polybutadiene determines its physical properties and it has been shown that the product having a high proportion of the units in the cis-1,4 configuration has many properties similar to those of natural rubber and can be used as a replacement for natural rubber in the production of products such as heavy duty tires. It has even been established that cis-1,4 polybutadiene is superior to natural rubber in some respects.

It is already known that conjugated diolefins can be polymerized at relatively low temperatures and pressures to produce high molecular weight polymers using a process involving a catalyst mixture of an organo-metallic reducing agent and reducible compounds of heavy metals. These catalysts usually permit the production of polymers of controlled molecular structure. It is known, for example, that when butadiene is polymerized in the presence of a catalyst formed by mixing titanium tetrabutoxide and aluminum triethyl, a product is obtained of which more than 75% is in the 1,2 configuration.

The object of the present invention is to provide a process for the polymerization of butadiene to produce a polymer in which at least 75%, and preferably 80% of the units are in the cis-1,4 configuration using a catalyst composition containing alkoxides of the heavy metals of Group IV of the Periodic Table.

The term butadiene as used throughout this application refers to butadiene-1,3 and is not intended to include butadiene-1,2 or derivatives of butadiene-1,3 such as chlorobutadiene or isoprene. The Periodic Table referred to is that shown in Handbook of Chemistry and Physics, Chemical Rubber Publishing Company, Cleveland, Ohio, 33rd edition (1951).

The invention provides a process of producing a polymer of butadiene in which at least 75% of the units are in the cis-1,4 configuration which comprises polymerizing butadiene in the presence of a catalyst system comprising a mixture of a first component represented by the formula $TiCl_n(OR)_{4-n}$ and a second component selected from the group consisting of (1) $AlR'_mI_{3-m}$ and (2) a mixture of $AlR'_3$ and an iodine compound represented by the formula XI, where R is a hydrocarbon radical having 1–12 carbon atoms, R' is selected from the group consisting of hydrogen and hydrocarbon radicals having 1–12 carbon atoms, $n$ is a number from 0 to 3, $m$ is a number from 1 to 2, and X is selected from the group consisting of hydrogen, chlorine, bromine and iodine.

In one of its specific embodiments, the invention provides a process of producing polybutadiene containing at least 75% cis-1,4 addition which comprises homo-polymerizing butadiene with a catalyst formed by mixing $Ti(OR)_4$, $AlR_3$ and iodine, where R is a hydrocarbon radical having 1–12 carbon atoms.

The alkoxides which can be used as the first component of the catalyst system of the present invention may be represented by the general formula $TiCl_n(OR)_{4-n}$ where R is a hydrocarbon radical such alkyl, cycloalkyl and aryl radical, and $n$ is 0, 1, 2 or 3. The number of carbon atoms in the alkoxide radical is less than about 12 and the preferred compounds are those containing 2–4 carbon atoms. Thus, examples of the alkoxides which may be used include titanium tetraalkoxides such as titanium tetramethoxide, titanium tetraethoxide, titanium tetrapropoxide, titanium tetrabutoxide, titanium tetraoctyloxide, titanium tetranaphthyloxide; and chlorine containing titanium alkoxides such monochloro trimethyl titanate $(TCl(OCH_3)_3)$, dichloro dimethyl titanate $(TiCl_2(OCH_3)_2)$, trichloro monomethyl titanate $(TiCl_3(OCH_3))$, monochloro triethyl titanate $(TiCl(OC_2H_5)_3)$, dichloro dipropyl titanate $(TiCl_2(OC_3H_7)_2)$, trichloro monobutyl titanate $(TiCl_3(OC_4H_9)_2)$, and various other ester groups with titanium. It is understood, of course, that the hydrocarbon radical containing 3 or more carbon atoms may be any of the various isomers such as n-propyl or iso-propyl. It is also to be understood that mixed radical alkoxides, for example, titanium diethoxide dibutoxide or monochloro monomethyl monoethyl monobutyl titanate can be used without departing from the scope of the invention.

As noted above, a first group of compounds which may serve as the second component of the catalyst system and hence may be admixed with the titanium alkoxides to form the catalyst system are compounds in which there are both a hydrocarbon radical and an iodine atom chemically bonded or bound to aluminum. Such compounds may be represented by the formula $AlR'_mI_{3-m}$ in which R' is a substituent selected from the group consisting of hydrogen and hydrocarbon radicals having 1–12 carbon atoms and $m$ is a number from 1 to 2. Examples of such compounds include aluminum diethyl monoiodide, aluminum monoethyl monoiodo hydride, aluminum monoethyl diiodide, aluminum diisobutyl monoiodide, aluminum monoisobutyl monoiodo hydride, aluminum monoisobutyl diiodide, aluminum dihexyl monoiodide, monoethyl aluminum monoisobutyl monoiodide, monohexyl aluminum monoisobutyl monoiodide, aluminum dibenzyl monoiodide, monobenzyl aluminum monoethyl monoiodide, and various combinations of other hydrocarbon groups with aluminum and with iodine. The size of the R' radical is not critical although it is preferable to use those containing from 1 to 12 carbon atoms. R' may be a monovalent aliphatic hydrocarbon or a monovalent aromatic hydrocarbon; the most practical of such compounds are saturated aliphatic hydrocarbon radicals having 2–8 carbon atoms.

As further noted above, the second component of the catalyst system may be a mixture of a compound represented by the formula AlR'$_3$ and iodine, iodine monochloride, iodine monobromide or hydrogen iodide. These iodine compounds may be represented by the general formula XI, where X is H, Cl, Br or I. The compound of the formula AlR'$_3$ may be any compound in which R' is a substituent selected from the group consisting of hydrogen and hydrocarbon radicals having 1–12 carbon atoms. Examples of such compounds are aluminum triethyl, aluminum diethyl monohydride, aluminum triisobutyl, aluminum di-isobutyl monohydride, aluminum dihexyl monohydride, monoethyl aluminum di-isobutyl, monohexyl aluminum di-isobutyl, aluminum dibenzyl monohydride and monobenzyl aluminum diethyl. Thus, R' may be hydrogen or a monovalent aliphatic hydrocarbon or a monovalent aromatic hydrocarbon containing 1–12 carbon atoms, the most practical cases being those where R' is a saturated aliphatic hydrocarbon radical having 2–8 carbon atoms.

The aluminum compound may be in the form of an addition compound with a polar compound provided such addition does not result in serious lowering of the yield or of the cis content of the product. For example, it is known that an ether, such as diisopropyl ether, forms a coordination compound with organo-aluminum compounds in this system, and it has been found that such etherates can be used in the practice of the present invention.

Catalyst systems may be prepared by mixing the alkoxide (it may alternatively be called an ester) with a metal trialkyl and iodinating the mixture; such iodination may be effected by any suitable means using iodine in a reactive form. For example, titanium tetrabutoxide may be mixed in an inert atmosphere with aluminum triisobutyl to form a complex. The complex may then be reacted with free iodine to produce an iodinated catalyst. Alternatively, aluminum triisobutyl may be reacted with free iodine and the product of this reaction mixed with titanium tetrabutoxide to form the catalyst complex. The reaction mechanism is not fully understood but it is believed that the iodine replaces an alkyl group on the complex or on the metal alkyl, depending on the order of addition. The iodination may be effected using other compounds which provide iodine in a reactive or free form, including iodine monochloride, iodine monobromide and hydrogen iodide. The total amount of catalyst which is required to produce a satisfactory yield of polymer at a reasonable rate varies with polymerization variables such as temperature and purity of reactants and can be determined readily by those skilled in the art. However, the molar ratio of aluminum to titanium in the catalyst mixture is critical in that at least a minimum ratio is required to effect polymerization. Thus, it is desirable to use ratios greater than 1 and, while there is no theoretical upper limit, it is desirable for practical purposes not to exceed a ratio of about 10. When a chlorine containing titanium alkoxide is used, the preferred ratio of aluminum to titanium is between 1.5:1 and 6:1. In the catalyst system based on titanium tetraalkoxide, the preferred ratio is from 4.5:1 to 7:1.

In the production of the high cis-1,4 polybutadiene in accordance with the invention, it is essential that a small amount of iodine be chemically bound in the catalyst complex. It is surprising that this small change in the catalyst complex can convert a catalyst from one which produced predominantly 1,2 polybutadiene to one which produces polybutadiene containing more than 75% and frequently more than 90% of cis-1,4 product. The proportion of bound iodine is conveniently expressed in terms of the molar ratio of iodine to of the aluminum present. The molar ratio of iodine to aluminum is maintained between 0.25:1 and 2:1. Where the catalyst system comprises a mixture of a titanium alkoxide and a compound represented by the formula AlR'$_m$I$_{3-m}$ or comprises a mixture of a compound of the formula AlR'$_3$ and iodine it is found that in order to attain a polymer in which at least 75% of the units are in the cis-1,4 configuration the molar ratio of iodine to aluminum in the catalyst system should be in the range of 0.4:1 to 1.5:1. When using a catalyst system comprising a mixture of a compound of the formula AlR'$_3$ and iodine monochloride, iodine monobromide or hydrogen iodide polymers with a cis-1,4 content of at least 75% can be obtained with iodine to aluminum ratios in the range of 0.25:1 to 1.5:1. The molar ratio of iodine to aluminum in the catalysts which comprise a mixture of titanium alkoxide with a compound of the formula AlR'$_m$I$_{3-m}$ or a mixture of AlR'$_3$ with iodine is preferably in the range from about 0.8:1 to 1.5:1. The iodinated catalyst complex may be obtained in a variety of ways. It may be prepared by mixing the alkoxide with any of (1) dialkyl aluminum monoiodide, (2) monoalkyl aluminum iodide, (3) mixtures of dialkyl aluminum monoiodide with monoalkyl aluminum diiodide and (4) mixtures of aluminum trialkyl with (1), (2) or (3). As mentioned previously, the catalyst complex may also be prepared by mixing and reacting alkoxide with aluminum trialkyl and iodinating the reaction product.

The polymerization may be carried out over a wide range of temperatures varying from about −25° C. to about 100° C. although temperatures outside this range can be used without departing from the scope of the invention. The preferred operating range is between about −15° C. and +70° C. The reactants may be dispersed in a non-reactive liquid medium such as pentane, hexane, heptane, cyclohexane, benzene or toluene or any other relatively low boiling non-reactive solvent which can be readily removed from the reaction product. It is usually preferable to use an amount of solvent such that the viscosity of the reaction medium permits ready mixing and heat exchange. However, from the point of view of the product obtained, the proportion of solvent is not critical and it is even possible to operate in the complete absence of solvent in which case monomeric butadiene acts as diluent. The method of addition of the catalyst components to the polymerization system may be varied depending upon the particular method of carrying out the polymerization and on the particular components of the catalyst system. Thus, they may be added in various orders, all at once or in increments or continuously during the polymerization, provided the catalyst complex present during polymerization contains the specified proportion of bound iodine per mole of aluminum. If the catalyst complex is formed in the polymerization vessel, it is desirable that the components thereof be admixed before the addition of butadiene. However, in such catalyst preparation, the components may be added in any order.

The invention will be described in greater detail by means of experimental results. The experiments were carried out using commercial grade butadiene consisting of 96.5 to 98.5% butadiene-1,3 with the balance including butane, butene-1, butene-2 and water. Unless otherwise indicated, both the alkoxide and the metal alkyl were added as approximately 1 molar solutions in heptane. Unless otherwise indicated, titanium tetrabutoxide contains the n-butyl isomer.

In the experiments, the diluent was dried either by distillation over aluminum triisobutyl or by treatment with calcium hydride, and butadiene was dried by passing it over alumina and calcium hydride. Polymerizations were carried out in standard seven ounce crown capped bottles which had previously been thoroughly dried and flushed with nitrogen. The bottles, filled with nitrogen, were capped and the reaction components charged using a hypodermic needle inserted through a rubber gasket. The bottles were maintained at a constant temperature while polymerization proceeded. At the end of the desired period, the reaction was stopped by the injection either of an excess of ethanol or isopropanol and the product in each bottle was then transferred to a separate flask and heated to 35–50° C. for a period of one hour to remove the diluent and unreacted butadiene. The polymer was then extracted with boiling ethanol to destroy residual catalyst and dried under vacuum at 50° C. for 16 hours. The conversion was calculated from the weight of monomer charged and the weight of polymer obtained. The structural analysis of the polymer was determined by means of an infra-red spectrophotometer. The analyses were based on the assumption that the polymer contained one unsaturated bond for each monomer unit. The structure is shown in the following experiments as the 1,2 content and cis-1,4 content and it is to be understood that the balance of the material has a trans-1,4 configuration.

EXAMPLE I

Butadiene was polymerized in the presence of a catalyst system formed by admixing titanium tetrabutoxide with $Al(C_2H_5)_2I$. The reactants were charged according to the following recipe:

Heptane—15 mls.
Titanium tetrabutoxide—$0.5 \times 10^{-3}$ moles.
Diethyl aluminum monoiodide—Variable.
Butadiene—15 mls.

The reaction was allowed to continue overnight at 30° C. The mole ratios of aluminum to titanium varied as shown in Table I which also shows the conversions achieved and the structure of the product. The mole ratio of iodine to aluminum was constant at 0.5.

TABLE I.—POLYMERIZATION USING $Ti(OC_4H_9)_4$ AND $Al(C_2H_5)_2I$

| Run Number | Al/Ti (Mole Ratio) | Conv. (Percent) | 1,2 Content (Percent of total) | Cis-1,4 (Percent of total) |
|---|---|---|---|---|
| 1 | 4.6 | 92 | 7 | 78 |
| 2 | 4.8 | 93 | 7 | 75 |
| 3 | 4.8 | 93 | 6 | 79 |
| 4 | 5.0 | 90 | 6 | 80 |

EXAMPLE II

Butadiene was polymerized according to the invention in the presence of a catalyst system prepared by reacting titanium tetrabutoxide with aluminum triethyl and reacting the product formed thereby with free iodine. The catalyst was formed in the polymerization bottle by first adding 10 mls. of pentane followed by 0.8 ml. of a one molar solution of titanium tetrabutoxide in pentane and 4.25 mls. of a one molar solution of aluminum triethyl in pentane. The mixture was allowed to age at room temperature for 15 minutes after which 9.2 mls. of a 0.25 molar solution of $I_2$ in benzene was added and allowed to react for 45 minutes. The molar ratio of iodine to aluminum in the catalyst system was thus 0.54. Then 30 mls. of butadiene were added and polymerization allowed to proceed overnight at 30° C. A conversion of 80 percent was achieved and the product was found to contain 7 percent 1,2 material and 88% cis-1,4 material.

EXAMPLE III

Butadiene was polymerized using a catalyst system prepared by reacting benzyl titanate with aluminum triethyl and reacting the product formed thereby with iodine. The catalyst was formed in the polymerization bottle by first adding 10 mls. of heptane followed by one ml. of a one molar solution of benzyl titanate in pentane and 5 mls. of a one molar solution of aluminum triethyl in pentane. Then 5.2 millimoles of iodine as a 0.25 molar solution in benzene was added and allowed to react for 60 minutes. The molar ratio of iodine to aluminum in the catalyst system was then 1.04. Then 25 mls. of butadiene were added and polymerization allowed to proceed overnight at 30° C. A conversion of 95 percent was achieved and the product was found to contain 4 percent 1,2 material and 89 percent cis-1,4 material.

EXAMPLE IV

Example III was repeated except that nonyl titanate was used instead of benzyl titanate. A conversion of 100 percent was achieved and analysis of the product showed it to contain 6 percent 1,2 material and 80 percent cis-1,4 material.

EXAMPLE V

Example III was repeated except that 2.8 millimoles of iodine monochloride added as a one molar solution in benzene were used in the preparation of the catalyst instead of iodine. The molar ratio of iodine to aluminum in the catalyst system was then 0.27. A conversion of 81 percent was achieved and the product was found to contain 6 percent 1,2 material and 81 percent cis-1,4 material.

EXAMPLES VI–X

Butadiene was polymerized using titanium tetrabutoxide (butyl titanate) and diethyl aluminum monoiodide as in Example I except that the amounts of the ingredients were varied. In Examples VI to IX, the amount of titanium tetrabutoxide used was 0.4 millimole and in Example X it was 0.5 millimole. The reactions were carried out overnight at 30° C. except in Example VIII which was carried out at room temperature. The other recipe details as well as the cis-1,4 content of the product are shown in Table II. In all cases, the 1,2 content was found to be 5%.

TABLE II

| Example | Diluent (Mls.) | Butadiene (Mls.) | $Al(C_2H_5)_2I$* (Millimoles) | Conversion (percent) | Cis-1,4 (Percent of total) |
|---|---|---|---|---|---|
| VI | 15 | 30 | 1.8 (4.5) | 11 | 88 |
| VII | 15 | 15 | 1.9 (4.8) | 90 | 90 |
| VIII | None | 30 | 1.9 (4.8) | 62 | 93 |
| IX | 40 | 15 | 2.3 (5.8) | 96 | 85 |
| X | 40 | 20 | 3.5 (7.0) | 100 | 80 |

*The figure in brackets shows the mole ratio of diethyl aluminum monoiodide to titanium tetrabutoxide in the recipe.

EXAMPLE XI

Butadiene was polymerized using a catalyst system formed by admixing titanium monochlorotributoxide and aluminum diethylmonoiodide. The reactants were charged according to the following recipe and in the order shown:

Heptane—10 mls.
$TiCl(OBu)_3$—$1 \times 10^{-3}$ moles.
Aluminum diethyl monoiodide—$3 \times 10^{-3}$ moles.
Butadiene—25 mls.

The polymerization bottles were tumbled end over end in a water bath at 30° C. for 16 hours. A yield of 2.5 grams of polymer were recovered and infra-red analysis showed it to be made up of 87% cis-1,4, 7% trans-1,4 and 6% 1,2 material.

EXAMPLE XII

Butadiene was polymerized as in Example XI except that the amount of aluminum diethyl monoiodide was $4 \times 10^{-3}$ moles. A yield of 14.2 grams of polybutadiene which analyzed as 79% cis-1,4, 13% trans-1,4 and 8% 1,2 material was obtained.

EXAMPLE XIII

Butadiene was polymerized as in Example XI except that the aluminum diethylmonoiodide was replaced by 4 millimoles of the diisopropyl etherate of aluminum triethyl and 2.16 millimoles of $I_2$. The mixture of the catalyst components in heptane was aged for 45 minutes at room temperature before the addition of the butadiene.

A yield of 6.8 grams of polybutadiene which analyzed as 77% cis-1,4, 16% trans-1,4 and 7% 1,2 material was recovered.

EXAMPLES XIV AND XV

Butadiene was polymerized as in Example XI except that the aluminum diethylmonoiodide was replaced in Example XIV by 4 millimoles of aluminum triethyl and 2.2 millimoles of iodine monobromide and in Example XV by 4 millimoles of aluminum triethyl and 2.2 millimoles of iodine monochloride.

In both cases, 4.5 grams of polymer which analyzed as 78% cis-1,4, 16% trans-1,4 and 6% 1,2 material were obtained.

EXAMPLES XVI-XIX

Butadiene was polymerized using a catalyst system formed by admixing titanium dichlorodibutoxide with aluminum triethyl and $I_2$ according to the following recipe:

Heptane—40 mls.
$TiCl_2(OBu)_2$—$1 \times 10^{-3}$ moles.
Aluminum triethyl—Variable.
$I_2$—Variable.
Butadiene—20 mls.

The reactants were added in the order shown and after the addition of $I_2$ the mixture was aged at room temperature for 45 minutes before the addition of butadiene. Polymerization was carried out at 30° C. for 12 hours after which the polymers were recovered and tested. The data are shown in Table III.

TABLE III

| Example | $Al(C_2H_5)_3$ (millimoles) | $I_2$ (millimoles) | Yield (gms.) | Structure (percent) | | |
|---|---|---|---|---|---|---|
| | | | | Cis-1,4 | Trans-1,4 | 1,2 |
| XVI | 2 | 1.05 | 11.3 | 89 | 8 | 3 |
| XVII | 3 | 1.60 | 11.7 | 90 | 6 | 4 |
| XVIII | 3 | 2.0 | 11.4 | 90 | 6 | 4 |
| XIX | 4 | 2.65 | 11.0 | 82 | 14 | 4 |

In order to determine whether iodine is essential for the production of high cis polybutadiene using this catalyst system, 20 ccs. of butadiene were polymerized using the same catalyst as in Example XVI except that the iodine was omitted. 6.2 grams of polymer were obtained which analyzed as 34% cis-1,4 and 40% 1,2.

EXAMPLES XX TO XXII

Butadiene was polymerized using the same recipe as in Examples XVI-XIX except that the diisopropyl etherate of aluminum triethyl was used instead of aluminum triethyl. The polymerization was carried out and the polymers recovered and tested as in Examples XVI-XIX and the data are shown in Table IV.

TABLE IV

| Example | $Al(C_2H_5)_3$ Etherate (millimoles) | $I_2$ (millimoles) | Yield (gms.) | Structure (percent) | | |
|---|---|---|---|---|---|---|
| | | | | Cis-1,4 | Trans-1,4 | 1,2 |
| XX | 2 | 1.1 | 12.0 | 88 | 9 | 3 |
| XXI | 3 | 2.0 | 11.9 | 91 | 5 | 4 |
| XXII | 4 | 2.7 | 11.8 | 90 | 7 | 3 |

EXAMPLES XXIII TO XXV

Butadiene was polymerized using a catalyst system formed by admixing titanium trichloromonobutoxide, aluminum triethyl and $I_2$. The polymerization recipes used are shown in Table V.

TABLE V

| Example | Heptane (mls.) | $TiCl_3OBu$ (millimoles) | $Al(C_2H_5)_3$ (millimoles) | $I_2$ (millimoles) | Butadiene (mls.) |
|---|---|---|---|---|---|
| XXIII | 40 | 1 | 2 | 1.1 | 20 |
| XXIV | 40 | 1 | 3 | 2.0 | 20 |
| XXV | 10 | 0.5 | 3 | 1.6 | 25 |

Polymerization was carried out at 30° C. for 16 hours and the polymer recovered and tested as in previous examples. In Example XXIII, 7.4 grams of a product analyzing as 85% cis-1,4 was obtained. In Example XXIV, 1.3 grams of a polymer which was 79% cis-1,4 was obtained and in Example XXV, 15 grams of a polymer which analyzed as 86% cis-1,4 was obtained.

In order to determine whether iodine is essential for the production of high cis polybutadiene using this catalyst system, 20 ccs. of butadiene were polymerized using the same catalyst system as in Example XXIV except that the iodine was omitted. 1.5 grams of polymer were obtained and infra-red analysis showed it to be made up of 60% cis-1,4 material and 20% 1,2 material.

EXAMPLES XXVI TO XXVIII

Butadiene was polymerized using a catalyst system formed by admixing titanium trichloromonobutoxide, the diisopropyl etherate of aluminum triethyl and $I_2$ according to the following recipe:

Heptane—40 mls.
$TiCl_3OBu$—$1 \times 10^{-3}$ moles.
$Al(C_2H_5)_3$ etherate—Variable.
$I_2$—Variable.
Butadiene—20 mls.

The catalyst mixture was aged at room temperature after the addition of $I_2$ and before the addition of the butadiene. Polymerization was carried out for 16 hours at 30° C. as in previous examples and the polymer recovered and analyzed. The results are shown in Table VI.

TABLE VI

| Example | $Al(C_2H_5)_3$ Etherate (millimoles) | $I_2$ (millimoles) | Yield (gms.) | Structure (percent) | | |
|---|---|---|---|---|---|---|
| | | | | Cis-1,4 | Trans-1,4 | 1,2 |
| XXVI | 2 | 1.1 | 12.3 | 91 | 5 | 4 |
| XXVII | 3 | 1.6 | 12.6 | 90 | 5 | 5 |
| XXVIII | 3 | 2.0 | 12.3 | 88 | 6 | 6 |

The examples are intended to illustrate the invention and not to unduly limit it. In this respect, the heavy metal compounds shown in the examples contain the butyl radical. However, the butyl radical may be replaced by ethyl, propyl, amyl, hexyl and the like and the inventors have even found that methyl cyclohexyl and naphthyl radicals can be used. Similarly, it should be understood that although the examples show aluminum compounds containing the ethyl radical, this can be replaced by other hydrocarbon radicals such as butyl, isobutyl, hexyl and octyl radical.

We claim:
1. A process of producing a polymer of butadiene in which at least 75% of the units are in the cis-1,4 configuration which comprises polymerizing butadiene in the presence of a catalyst system comprising a mixture of a first component represented by the formula $TiCl_n(OR)_{4-n}$ and a second component selected from the group consisting of (1) $AlR'_mI_{3-m}$ and (2) a mixture of $AlR'_3$ and an iodine compound represented by the Formula XI, where R is a hydrocarbon radical having 1–12 carbon atoms, R' is selected from the group consisting of hydrogen and hydrocarbon radicals having 1–12 carbon atoms, $n$ is a number from 0 to 3, $m$ is a number from 1 to 2, and X is selected from the group consisting of hydrogen, chlorine, bromine and iodine.

2. The process according to claim 1 in which the second catalyst component is AlR'$_2$I.

3. The process according to claim 1 in which the second catalyst component is a mixture of AlR'$_3$ and I$_2$.

4. The process according to claim 1 in which the second catalyst component is a mixture of AlR'$_3$ and ICl.

5. The process according to claim 1 in which the molar ratio of iodine to aluminum in the catalyst system is between 0.25:1 and 2:1.

6. The process according to claim 3 in which the molar ratio of iodine to aluminum in the catalyst system is in the range of 0.4:1 to 1.5:1.

7. The process according to claim 1 in which R' is an alkyl radical having 2–8 carbon atoms.

8. The process according to claim 7 in which R' is ethyl radical.

9. The process according to claim 1 in which the first catalyst component is a titanium alkoxide containing 1 to 3 chlorine atoms.

10. The process according to claim 9 in which the amount of the iodine compound is between 0.5 and 1.5 moles per mole of organo-aluminum compound.

11. The process according to claim 10 in which the molar ratio of aluminum to titanium in the catalyst system is greater than 1:1.

12. The process according to claim 11 in which the molar ratio of aluminum to titanium in the catalyst system is between 1.5:1 and 6:1.

13. The process according to claim 1 in which the first catalyst component has the formula Ti(OR)$_4$.

14. The process according to claim 13 in which the molar ratio of aluminum to titanium is between 3 and 10.

15. The process according to claim 14 in which the molar ratio of aluminum to titanium is between 4.5:1 and 7:1.

16. The process according to claim 13 in which R is a butyl radical.

17. The process according to claim 1 in which butadiene is polymerized at a temperature within the range of −25° C. to +100° C. in the presence of a non-reactive liquid and the polymer thereby produced is recovered from the reaction mixture.

18. A process of producing polybutadiene containing at least 75% cis-1,4 addition which comprises homopolymerizing butadiene with a catalyst formed by mixing Ti(OR)$_4$, AlR$_3$ and I$_2$, where R is a hydrocarbon radical having 1–12 carbon atoms.

References Cited

UNITED STATES PATENTS 2,959,576   11/1960   Payne _____ 260—94.9

FOREIGN PATENTS 917,401   2/1963   Great Britain.
664,393            Canada.

JOSEPH L. SCHOFER, *Primary Examiner.*

R. A. GAITHER, *Assistant Examiner.*

UNITED STATES PATENT OFFICE
CERTIFICATE OF CORRECTION

Patent No. 3,409,604 November 5, 1968

Raymond A. Stewart et al.

It is certified that error appears in the above identified patent and that said Letters Patent are hereby corrected as shown below:

Column 2, line 50, after "such" insert -- as --; same line 50, "(TCl(OCH$_3$)$_3$)," should read -- (TiCl(OCH$_3$)$_3$),--.

Signed and sealed this 3rd day of March 1970.

(SEAL)
Attest:

Edward M. Fletcher, Jr.
Attesting Officer

WILLIAM E. SCHUYLER, JR.
Commissioner of Patents